United States Patent
Shi et al.

(10) Patent No.: US 10,007,143 B2
(45) Date of Patent: Jun. 26, 2018

(54) DISPLAY PANEL, FABRICATING METHOD THEREOF, DRIVING METHOD, DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Bo Shi, Beijing (CN); Shiqi Chen, Beijing (CN); Shaning Yan, Beijing (CN); Xiaohui Wu, Beijing (CN); Junrui Zhang, Beijing (CN)

(73) Assignees: BOE TECHNOLOGY GROUP CO., LTD, Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 33 days.

(21) Appl. No.: 15/090,048

(22) Filed: Apr. 4, 2016

(65) Prior Publication Data

US 2017/0010505 A1 Jan. 12, 2017

(30) Foreign Application Priority Data

Jul. 9, 2015 (CN) .......................... 2015 1 0400598

(51) Int. Cl.
*G02F 1/133* (2006.01)
*G02F 1/1335* (2006.01)
(Continued)

(52) U.S. Cl.
CPC .......... *G02F 1/133553* (2013.01); *G02F 1/15* (2013.01); *G02F 2001/133638* (2013.01); *G02F 2001/1635* (2013.01); *G02F 2201/44* (2013.01)

(58) Field of Classification Search
CPC ................................................ G02F 1/133553
See application file for complete search history.

(56) References Cited

U.S. PATENT DOCUMENTS

2002/0149733 A1* 10/2002 Lyu ..................... G02F 1/13363
349/155
2006/0103798 A1* 5/2006 Jang .................. G02F 1/133634
349/119
(Continued)

FOREIGN PATENT DOCUMENTS

CN 101211085 * 7/2008 ............. G02F 1/133
CN 101211085 A 7/2008
(Continued)

OTHER PUBLICATIONS

Office Action in Chinese Application No. 201510400598.8 dated Jul. 17, 2017, with English translation.

*Primary Examiner* — Sang V Nguyen
(74) *Attorney, Agent, or Firm* — Womble Bond Dickinson (US) LLP

(57) ABSTRACT

A display panel, a fabricating method thereof, and a display device are disclosed, which relate to the field of display technology. The display panel comprises an array substrate, an assembly substrate, and a liquid crystal layer arranged between the array substrate and the assembly substrate. The display panel has a totally transmissive mode and a totally reflective mode. An electrochromic reflective layer is arranged on a side of the array substrate close to the liquid crystal layer, and is configured to reflect external ambient light in the totally reflective mode and to exhibit a transparent state to completely transmit light in the totally transmissive mode.

8 Claims, 10 Drawing Sheets

(51) Int. Cl.
*G02F 1/15* (2006.01)
*G02F 1/13363* (2006.01)
*G02F 1/163* (2006.01)

(56) References Cited

U.S. PATENT DOCUMENTS

| | | | | |
|---|---|---|---|---|
| 2007/0279553 | A1* | 12/2007 | Yoda | G02F 1/13363 349/96 |
| 2010/0053522 | A1* | 3/2010 | Iwamoto | G02F 1/133634 349/119 |
| 2010/0309541 | A1* | 12/2010 | Lo | G02B 26/005 359/292 |
| 2011/0273643 | A1* | 11/2011 | Arai | G02F 1/133528 349/64 |
| 2012/0327329 | A1* | 12/2012 | Hsiao | G02F 1/13363 349/61 |
| 2013/0222748 | A1 | 8/2013 | Zhou et al. | |
| 2014/0022499 | A1* | 1/2014 | Tamaki | G02F 1/13439 349/106 |
| 2014/0168562 | A1* | 6/2014 | Feng | G02F 1/1335 349/57 |
| 2014/0218668 | A1* | 8/2014 | Sakai | G02F 1/13363 349/102 |
| 2015/0002783 | A1* | 1/2015 | Park | G02B 6/0081 349/64 |
| 2015/0002796 | A1* | 1/2015 | Fukunaga | G02F 1/133555 349/106 |
| 2015/0277164 | A1 | 10/2015 | Nagase et al. | |
| 2016/0033819 | A1* | 2/2016 | Li | G02F 1/133553 349/46 |

FOREIGN PATENT DOCUMENTS

| | | |
|---|---|---|
| CN | 202189212 U | 4/2012 |
| WO | WO 2014097591 A1 | 6/2014 |

* cited by examiner

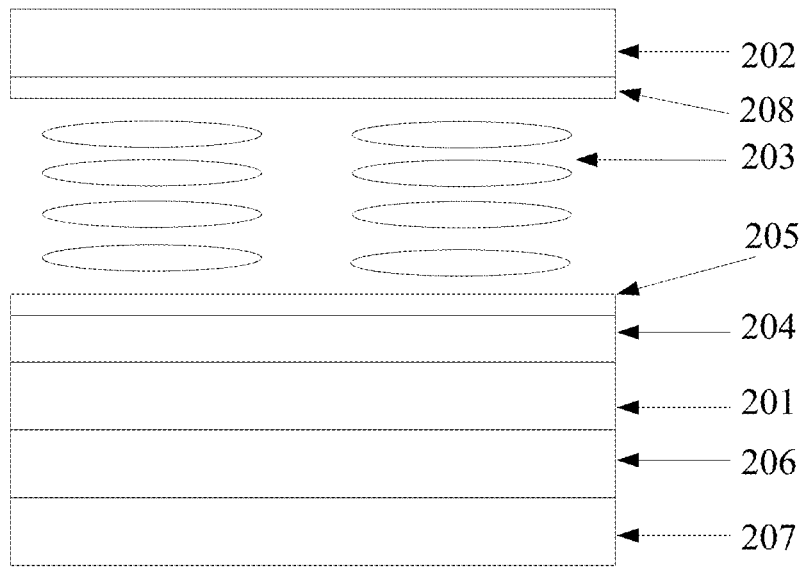

Fig. 17 sending an electrical signal to the electrochromic reflective layer, so that the display panel exhibits the totally reflective mode, and the electrochromic reflective layer is configured to reflect external ambient light in the totally reflective mode — 1801 stopping sending the electrical signal to the electrochromic reflective layer, so that the display panel exhibits the totally transmissive mode, the electrochromic reflective layer stays in a transparent state in the totally transmissive mode — 1802

Fig. 18

DISPLAY PANEL, FABRICATING METHOD THEREOF, DRIVING METHOD, DISPLAY DEVICE

RELATED APPLICATIONS

The present application claims the benefit of Chinese Patent Application No. 201510400598.8, filed Jul. 9, 2015, the entire disclosure of which is incorporated herein by reference.

FIELD OF THE INVENTION

Embodiments of the present invention relate to the field of display technology, and particularly to a display panel and a fabricating method thereof, a driving method, and a display device.

BACKGROUND OF THE INVENTION

A liquid crystal display is a display in which liquid crystal is adopted. On basis of a light source, the liquid crystal display can be classified into a transmissive liquid crystal display, a reflective liquid crystal display, and a transflective liquid crystal display. In the transmissive liquid crystal display, a backlight unit on a back side of a liquid crystal display panel is used as the light source, the light emitted by which passes the liquid crystal display panel and enters human eyes, whereby an image is displayed. In the reflective liquid crystal display, the liquid crystal display panel uses ambient light as the light source, and reflects the external light to display an image. Since there are strict requirements for the intensity of the external light in both the transmissive liquid crystal display and the reflective liquid crystal display, the transflective liquid crystal display emerges. The transflective liquid crystal display not only uses the backlight unit as the light source, but also uses the ambient light as the light source.

As shown in FIG. 1, in the related art, the liquid crystal display panel of the transflective liquid crystal display comprises a thin film transistor (TFT) substrate 001, as well as a resin layer 002 and a metal reflective layer 003 arranged on a side of the TFT substrate 001 close to the liquid crystal layer 004. A wave plate 008 and a lower polarizer 009 are arranged on a side of the TFT substrate 001 away from liquid crystal layer 004. The liquid crystal display panel further comprises a color filter (CF) substrate (i.e., an assembly substrate) 005. A wave plate 006 and an upper polarizer 007 are arranged on a side of the CF substrate 005 away from the liquid crystal layer 004. Further, alignment films are arranged on a side of the CF substrate 005 close to the liquid crystal layer 004, a side of the TFT substrate 001 close to the liquid crystal layer 004 except the resin layer 002, and a side of the metal reflective layer 003 close to the liquid crystal layer 004. During operation of the liquid crystal display panel, light M emitted by the backlight unit on the back side of the liquid crystal display panel successively passes the lower polarizer 009, the wave plate 008, the TFT substrate 001, the liquid crystal layer 004, the CF substrate 005, the wave plate 006, and the upper polarizer 007, and finally enters human eyes. The ambient light N passes the upper polarizer 007, the wave plate 006, the CF substrate 005, and the liquid crystal layer 004, is incident on and reflected by the metal reflective layer 003, successively passes the liquid crystal layer 004, the CF substrate 005, the wave plate 006, and the upper polarizer 007, and enters human eyes. The region where the resin layer 002 is located is a reflection region, and the region on the TFT substrate 001 apart from the resin layer 002 is a transmission region. As an example, in FIG. 1, the region at the left side of a dotted line is the transmission region, and the region at the right side of the dotted line is the reflection region.

In the liquid crystal display panel, the reflection region is independent from the transmission region. Since the overall region of the liquid crystal display panel is limited, the light is reflected in a relatively small region of the liquid crystal display panel, and is transmitted in a relatively small region of the liquid crystal display panel. As a result, the liquid crystal display panel has a small aperture ratio, a low transmittance, and a poor quality of the displayed image.

SUMMARY OF THE INVENTION

In order to solve the problem of a poor quality of the displayed image, embodiments of the present invention provide a display panel, a fabricating method thereof, a display device, and an array substrate. The technical solutions are described as follow.

In a first aspect, it is provided a display panel comprising an array substrate, an assembly substrate, and a liquid crystal layer arranged between the array substrate and the assembly substrate, the display panel has a totally transmissive mode and a totally reflective mode, the display panel comprises:

an electrochromic reflective layer which is formed a side of the array substrate close to the liquid crystal layer, the electrochromic reflective layer is configured to reflect external ambient light in the totally reflective mode, and to exhibit a transparent state to completely transmit light in the totally transmissive mode.

For example, the display panel further comprises a switch unit which is electrically connected with the electrochromic reflective layer and configured to control an electrical signal fed to the electrochromic reflective layer.

For example, the switch unit is a thin film transistor.

For example, the display panel further comprises:

a first alignment film which is arranged on the array substrate with the electrochromic reflective layer;

a first wave plate and a lower polarizer which are arranged successively on a side of the array substrate away from the liquid crystal layer;

a second alignment film which is arranged on a side of the assembly substrate close to the liquid crystal layer; and a second wave plate and an upper polarizer which are arranged successively on a side of the assembly substrate away from the liquid crystal layer.

For example, the first wave plate comprises a first quarter wave plate and a first half wave plate;

the first quarter wave plate, the first half wave plate and the lower polarizer are successively arranged on the side of the array substrate away from the liquid crystal layer.

For example, the second wave plate comprises a second quarter wave plate;

the second quarter wave plate and the upper polarizer are arranged on the side of the assembly substrate away from the liquid crystal layer.

For example, the liquid crystal layer is an electrically controlled birefringence liquid crystal layer;

the lower polarizer has a polarization angle of 0 degree;

the first quarter wave plate and the second quarter wave plate have a polarization angle of 135 degree;

the first half wave plate has a polarization angle of 45 degree;

the upper polarizer has a polarization angle of 90 degrees;

the first alignment film has a rubbing orientation of 135 degree; and the second alignment film has a rubbing orientation of −135 degree.

For example, the second wave plate further comprises a second half wave plate;

the second quarter wave plate, the second half wave plate and the upper polarizer are arranged on the side of the assembly substrate away from the liquid crystal layer.

For example, the liquid crystal layer is a vertical alignment liquid crystal layer;

the lower polarizer has a polarization angle of 0 degree;

the first quarter wave plate and the second quarter wave plate have a polarization angle of 75 degree;

the first half wave plate and the second half wave plate have a polarization angle of 15 degree; and the upper polarizer has a polarization angle of 0 degree.

In a second aspect, it is provided a method for fabricating any of the display panel in the first aspect, comprising:

forming the electrochromic reflective layer on the side of the array substrate close to the liquid crystal layer, when the electrochromic reflective layer receives an electrical signal, the display panel exhibits the totally reflective mode, and the electrochromic reflective layer is configured to reflect external ambient light in the totally reflective mode; and when the electrochromic reflective layer does not receive the electrical signal, the display panel exhibits the totally transmissive mode, and the electrochromic reflective layer stays in a transparent state in the totally transmissive mode.

For example, before forming the electrochromic reflective layer on the side of the array substrate close to the liquid crystal layer, the method further comprises:

forming the array substrate comprising a switch unit which is connected with the electrochromic reflective layer and configured to control the electrical signal fed to the electrochromic reflective layer.

For example, the switch unit is a thin film transistor.

For example, the method further comprises:

forming a first alignment film on the array substrate on which the electrochromic reflective layer has been formed;

forming successively a first wave plate and a lower polarizer on the side of the array substrate away from the liquid crystal layer;

forming a second alignment film on the side of the assembly substrate close to the liquid crystal layer; and forming successively a second wave plate and an upper polarizer on the side of the assembly substrate away from the liquid crystal layer.

For example, the first wave plate comprises a first quarter wave plate and a first half wave plate;

said forming successively the first wave plate and the lower polarizer on the side of the array substrate away from the liquid crystal layer comprises:

forming successively the first quarter wave plate, the first half wave plate and the lower polarizer on the side of the array substrate away from the liquid crystal layer.

For example, the second wave plate comprises a second quarter wave plate;

said forming successively the second wave plate and the upper polarizer on the side of the assembly substrate away from the liquid crystal layer comprises:

forming successively the second quarter wave plate and the upper polarizer on the side of the assembly substrate away from the liquid crystal layer.

For example, the liquid crystal layer is an electrically controlled birefringence liquid crystal layer;

the lower polarizer has a polarization angle of 0 degree;

the first quarter wave plate and the second quarter wave plate have a polarization angle of 135 degree;

the first half wave plate has a polarization angle of 45 degree;

the upper polarizer has a polarization angle of 90 degrees;

the first alignment film has a rubbing orientation of 135 degree; and the second alignment film has a rubbing orientation of −135 degree.

For example, the second wave plate further comprises a second half wave plate;

said forming successively the second wave plate and the upper polarizer on the side of the assembly substrate away from the liquid crystal layer comprises:

forming successively the second quarter wave plate, the second half wave plate and the upper polarizer on the side of the assembly substrate away from the liquid crystal layer.

For example, the liquid crystal layer is a vertical alignment liquid crystal layer;

the lower polarizer has a polarization angle of 0 degree;

the first quarter wave plate and the second quarter wave plate have a polarization angle of 75 degree;

the first half wave plate and the second half wave plate have a polarization angle of 15 degree; and the upper polarizer has a polarization angle of 0 degree.

In a third aspect, it is provided a method for driving any of the display panel in the first aspect, comprising:

sending an electrical signal to the electrochromic reflective layer, so that the display panel exhibits the totally reflective mode, and the electrochromic reflective layer is configured to reflect external ambient light in the totally reflective mode; and stopping sending the electrical signal to the electrochromic reflective layer, so that the display panel exhibits the totally transmissive mode, and the electrochromic reflective layer stays in a transparent state in the totally transmissive mode.

In a fourth aspect, it is provided a display device comprising any of the display panel in the first aspect and a backlight unit.

Embodiments of the present invention provide a display panel and a fabricating method thereof, a driving method, and a display device. Since an electrochromic reflective layer is arranged between the array substrate and the first alignment film, and acts as a transparent layer in the totally transmissive mode and a reflective layer in the totally reflective mode, a transmission region and a reflection region are located at a same region, and the electrochromic reflective layer is combined with a liquid crystal layer to realize switching between the totally transmissive display and the totally reflect display. As compared with the related art, the transmission region and the reflection region are increased in area, which increases the aperture ratio and transmittance, and thus increases the quality of the displayed image.

It is understood that the above general description and the following specific description are exemplary and interpretative, and should not restrict the present invention in any sense.

BRIEF DESCRIPTION OF THE DRAWINGS

In order to more clearly illustrate technical solutions in embodiments of the present invention, accompanying drawings for illustrating these embodiments will be briefly introduced. It is apparent that the following drawings merely represent some embodiments of the present invention, and that a person with an ordinary skill in the art can obtain other drawings from these drawings without creative efforts.

FIG. 17 is a structural view for a second alignment film in an embodiment of the present invention; and FIG. 18 is a flow chart for a method for driving a display panel in an embodiment of the present invention.

The above drawings have illustrated specific embodiments of the present invention, and detailed description for these embodiments will be presented hereinafter. These drawings and description do not intend to restrict the scope of the present inventive concept, but to illustrate ideas of the present invention by referring to specific embodiments thereof.

DETAILED DESCRIPTION OF THE INVENTION

In order to make objects, technical solutions, and advantages of the present invention more clear, implementations of the present invention will further be described in detail hereinafter with reference to the accompanying drawings.

Figure 1:
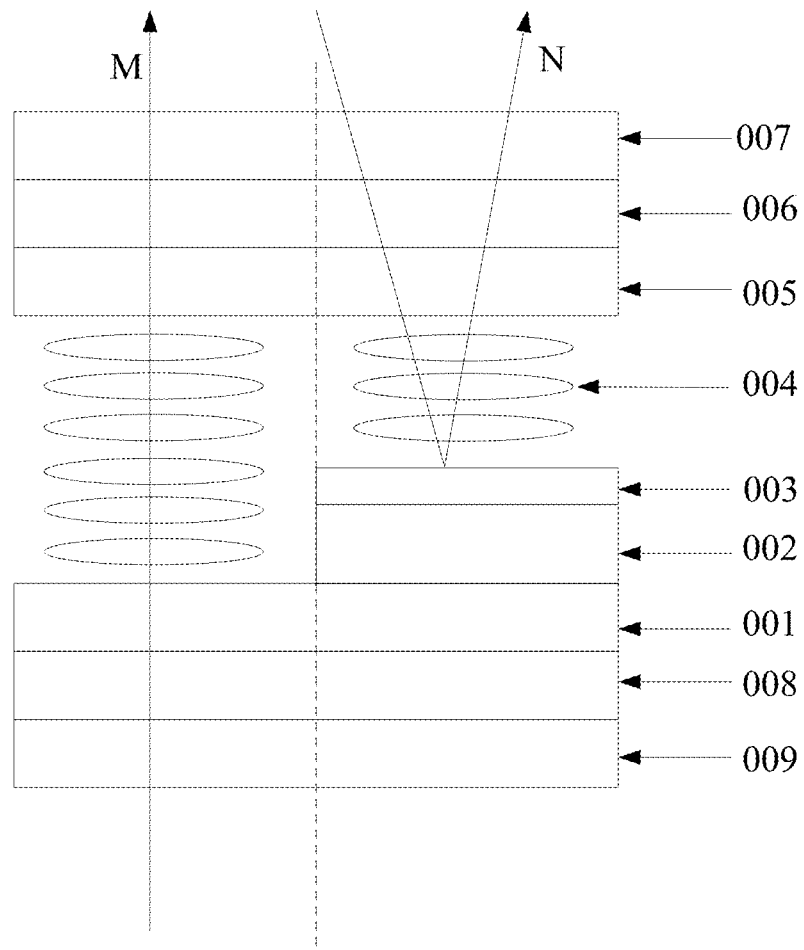
FIG. 1 is a structural view for a display panel in the related art.
Figure 2:
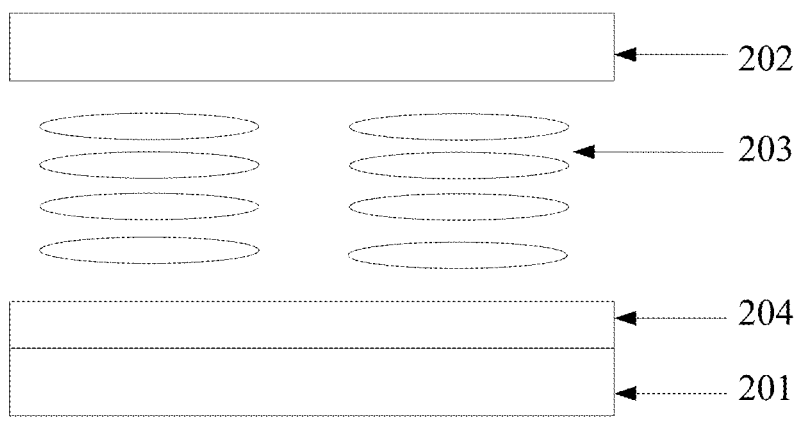
FIG. 2 is a structural view for a display panel in an embodiment of the present invention.

An embodiment of the present invention provides a display panel. As shown in FIG. 2, the display panel comprises an array substrate 201, an assembly substrate 202, and a liquid crystal layer 203 which is formed between the array substrate 201 and the assembly substrate 202. The display panel has a totally transmissive mode and a totally reflective mode. An electrochromic reflective layer 204 is arranged on a side of the array substrate 201 close to the liquid crystal layer 203. The electrochromic reflective layer 204 is configured to reflect external ambient light in a totally reflective mode, and to exhibit a transparent state to completely transmit light in a totally transmissive mode.

In the display panel according to the embodiment of the present invention, since the electrochromic reflective layer is formed on the array substrate, the electrochromic reflective layer is equivalent to a transparent layer in the totally transmissive mode, and a reflective layer in the totally reflective mode, a transmission region and a reflection region are located at a same region, and the electrochromic reflective layer is combined with a liquid crystal layer to realize switching between the totally transmissive display and the totally reflect display. As compared with the related art, the transmission region and the reflection region are increased in area, which increases the aperture ratio, transmittance, and thus quality of the displayed image.

Figure 3:
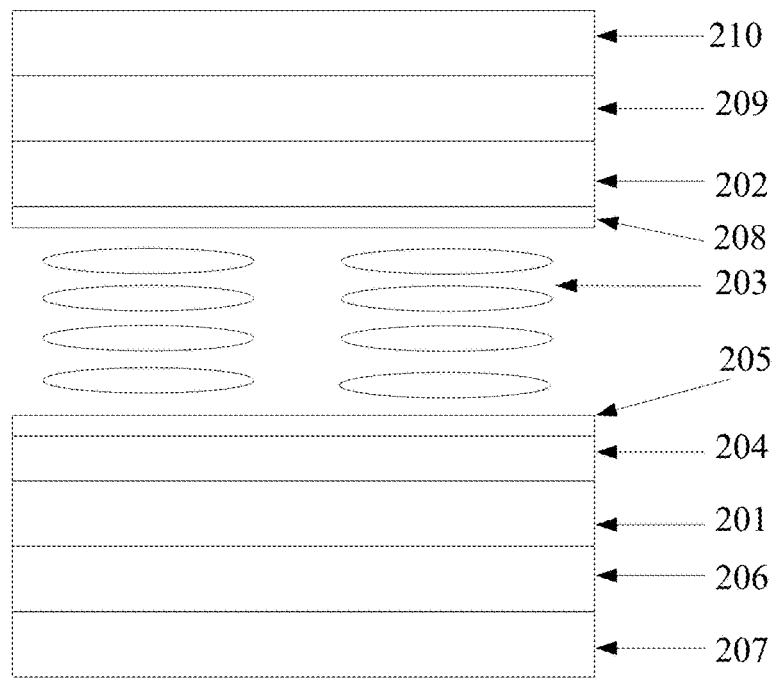
FIG. 3 is a structural view for another display panel in an embodiment of the present invention.

An embodiment of the present invention provides another display panel. As shown in FIG. 3, the display panel comprises an array substrate 201, an assembly substrate 202, and a liquid crystal layer 203 which is formed between the array substrate 201 and the assembly substrate 202. The display panel has a totally transmissive mode and a totally reflective mode. An electrochromic reflective layer 204 is arranged on a side of the array substrate 201 close to the liquid crystal layer 203. The electrochromic reflective layer 204 is configured to reflect external ambient light in the totally reflective mode, and to exhibit a transparent state to completely transmit light in the totally transmissive mode. The display panel further comprises: a switch unit (not shown) which is electrically connected with the electrochromic reflective layer 204, which is configured to control an electrical signal which is fed to the electrochromic reflective layer 204, and which is a thin film transistor; a first alignment film 205 which is formed on the array substrate 201 on which the electrochromic reflective layer 204 is formed; a first wave plate 206 and a lower polarizer 207 which are successively arranged on a side of the array substrate 201 away from the liquid crystal layer 203; a second alignment film 208 which is arranged on a side of the assembly substrate 202 close to the liquid crystal layer 203; and a second wave plate 209 and an upper polarizer 210 which are successively arranged on a side of the assembly substrate 202 away from the liquid crystal layer 203.

Under the action of an external electric field, an electrochromic reflective layer is subject to a stable and reversible change in its optical properties, such as reflectance, transmittance, and absorbance, so that the electrochromic reflective layer shows a reversible change in its appearance in term of color and transparent degree. An electrochromic material is divided into an inorganic electrochromic material and an organic electrochromic material. The inorganic electrochromic material mainly comprises tungsten trioxide ($WO_3$). Currently, the electrochromic device in which $WO_3$ is used as a functional material has been industrialized. The organic electrochromic material mainly comprises polythiophenes and their derivatives, viologens, tetrathiafulvalene, metallo phthalocyanines, or the like. An electrochromic material in which viologens are used as the functional material has been put into practical applications. There are many types of materials for the electrochromic reflective layer, and embodiments of the present invention are not restricted in this regard.

It is noted that, when an electrical signal is fed to the electrochromic reflective layer, the electrical signal can be fed to the electrochromic reflective layer not only through a transparent conductive layer in a same layer as a gate, but also through a transparent conductive layer in a same layer as a source/drain metal layer. Embodiments of the present invention are not restricted in the manner the electrical signal is fed.

A wave plate is an optical device in which light is directed through a crystal, polymer, or a liquid crystal so that a phase difference of the incident light is changed, and is also referred to as a phase retardation film. A quarter wave plate is a birefringent mono-crystalline sheet with a certain thickness. When light passes the quarter wave plate in a normal direction, a phase difference between an ordinary light (o light) and an extraordinary light (e light) equals to π/2 or its odd times. A half wave plate is a birefringent crystal with a certain thickness. When light passes the half wave plate in the normal direction, the phase difference between the ordinary light (o light) and the extraordinary light (e light) equals to π or its odd times. The half wave plate is also referred to as a ½ wave plate.

Figure 4:
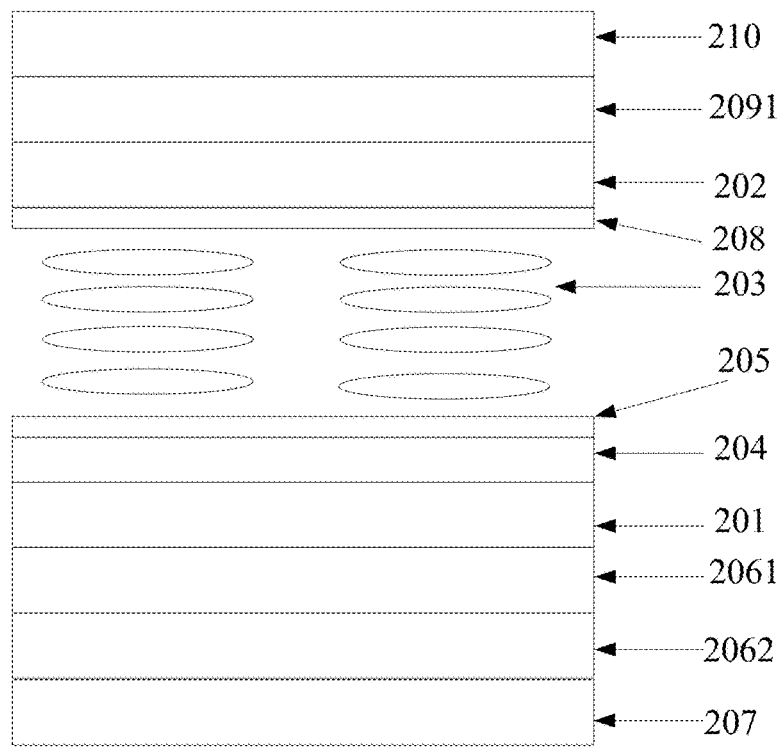
FIG. 4 is a structural view for a further display panel in an embodiment of the present invention.

For example, as shown in FIG. 4, the first wave plate 206 can comprise a first quarter wave plate 2061 and a first half wave plate 2062. Accordingly, the first quarter wave plate 2061, the first half wave plate 2062, and the lower polarizer 207 are successively arranged on a side of the array substrate 201 away from the liquid crystal layer 203. The second wave plate 209 can comprise a second quarter wave plate 2091. Accordingly, the second quarter wave plate 2091 and the upper polarizer 210 are successively arranged on a side of the assembly substrate 202 away from the liquid crystal layer 203.

It is noted that the liquid crystal layer can a liquid crystal layer of various kinds. As an example, the liquid crystal layer can be an electrically controlled birefringence (ECB) liquid crystal layer, a vertical alignment (VA) liquid crystal layer, and an advanced super dimension switch (Advanced Super Dimension Switch, ADS) liquid crystal layer.

In the display panel, by means of the electrochromic reflective layer between the array substrate and the first alignment film, a partial deflection effect is used to control the phase delay of liquid crystal. Besides, the phase retardation film i.e., the wave plate, is combined with the electrochromic reflective layer, so that light emitted by the backlight unit or ambient light is parallel with or perpendicular to the polarization direction of the upper polarizer. When the light emitted by the backlight unit or the ambient light is parallel with the polarization direction of the upper polarizer, the light goes through the upper polarizer, and a white color appears on the display panel. When the light emitted by the backlight unit or the ambient light is perpendicular to the polarization direction of the upper polarizer, the light can not go through the upper polarizer, and a black color appears on the display panel. In this way, the display panel is in a white color state when it transmits light and in a black state when it does not transmit light, and the final image can be displayed on the display panel.

When the liquid crystal layer is an ECB liquid crystal layer, the corresponding display panel can be shown in FIG. 4. The display panel comprises an array substrate 201, an assembly substrate 202, and an ECB liquid crystal layer 203 formed between the array substrate 201 and the assembly substrate 202. The display panel has a totally transmissive mode and a totally reflective mode. The electrochromic reflective layer 204 is arranged on a side of the array substrate 201 close to the liquid crystal layer 203. The electrochromic reflective layer 204 is configured to reflect external ambient light in the totally reflective mode, and to exhibit a transparent state to completely transmit light in the totally transmissive mode. The display panel further comprises: a switch unit (not shown) which is electrically connected with the electrochromic reflective layer 204, is configured to control an electrical signal which is fed to the electrochromic reflective layer 204, and is a thin film transistor; a first alignment film 205 which is formed on the array substrate 201 on which the electrochromic reflective layer 204 is formed; a first quarter wave plate 2061, a first half wave plate 2062, and a lower polarizer 207 which are successively arranged on a side of the array substrate 201 away from the liquid crystal layer 203; a second alignment film 208 which is arranged on a side of the assembly substrate 202 close to the liquid crystal layer 203; a second quarter wave plate 2091 and an upper polarizer 210 which are successively arranged on a side of the assembly substrate 202 away from the liquid crystal layer 203. Meanwhile, the lower polarizer 207 can have a polarization angle of 0 degree, the first quarter wave plate 2061 and the second quarter wave plate 2091 can have a polarization angle of 135 degree, the first half wave plate 2062 can have a polarization angle of 45 degree, the upper polarizer 210 can have a polarization angle of 90 degrees, the first alignment film 205 has a rubbing orientation of 135 degree, and the second alignment film 208 has a rubbing orientation of −135 degree.

Figure 5:
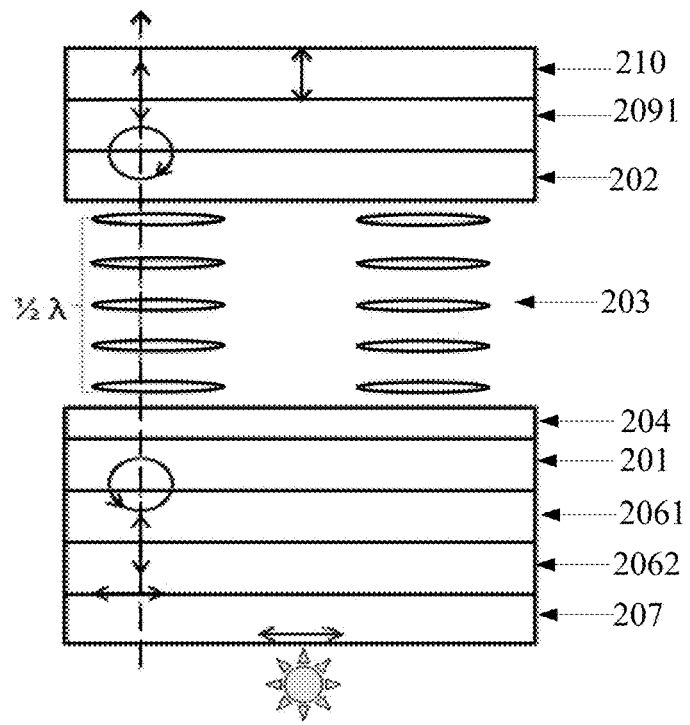
FIG. 5 is a view for the display panel shown in FIG. 4 operating in a totally transmissive mode.
Figure 6:
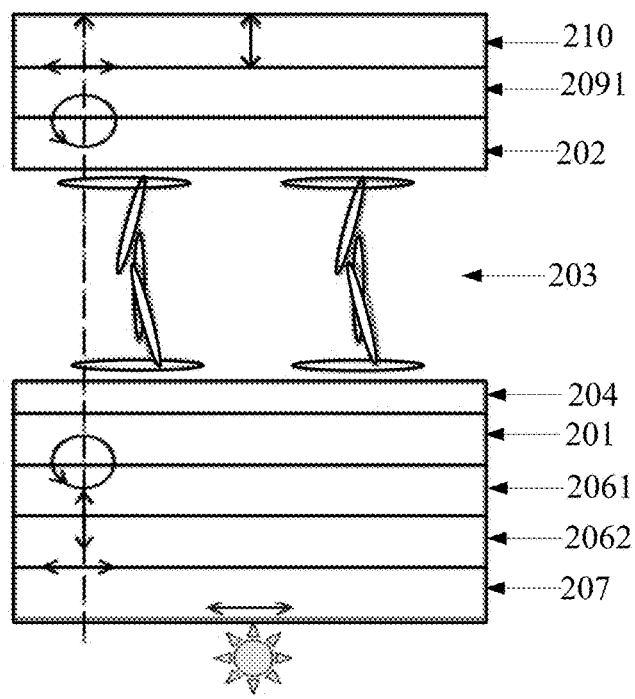
FIG. 6 is another view for the display panel shown in FIG. 4 operating in the totally transmissive mode.

When the liquid crystal layer is an ECB liquid crystal layer, the display panel operating in the totally transmissive mode in an embodiment of the present invention is shown by views in FIG. 5 and FIG. 6. At this time, the electrochromic reflective layer does not receive an electrical signal, the display panel exhibits the totally transmissive mode, and the electrochromic reflective layer stays in a transparent state in the totally transmissive mode. The electrochromic reflective layer is not in operating state, and is equivalent to transparent layer. The backlight unit on the back side of the display panel functions as a light source.

When the display state of an image is a white color state, as shown in FIG. 5, the liquid crystal of the ECB liquid crystal layer 203 is not in its operating state, light from the backlight unit passes the lower polarizer 207 and then is changed to a linearly polarized light parallel with the polarization direction of the lower polarizer 207, i.e., the linearly polarized light has a polarization direction of 0 degree. The linearly polarized light passes the first half wave plate 2062 and is deflected by 2 times an intersection angle between a vibration plane of the linearly polarized light and a principal sectional plane of the wave plate, so that it is changed to a linearly polarized light with a polarization direction of 90 degrees. After passing the first quarter wave plate 2061, the linearly polarized light is changed to a left-handed polarized light. After passing the ECB liquid crystal layer 203 (equivalent to a half wave plate which realizes a phase delay of $\lambda/2$), the linearly polarized light is changed to a right-handed polarized light. The right-handed polarized light passes the second quarter wave plate 2091 on an outer side of the assembly substrate 202 and is changed to a linearly polarized light with a polarization direction of 90 degrees. Since the upper polarizer 210 has a polarization angle of 90 degrees, the linearly polarized light at this time is parallel with the polarization direction of the upper polarizer 210, the upper polarizer 210 transmits the linearly polarized light, and the display state of an image is a white color display state.

It is noted that, for the purpose of changing the left-handed polarized light which has passed the first quarter wave plate 2061 into the right-handed polarized light, the ECB liquid crystal layer can be set to have a same polarization angle as that of the half wave plate. In this way, the ECB liquid crystal layer plays a same role as the half wave plate. In particular, the polarization angle of the ECB liquid crystal layer can be adjusted, by setting the anisotropy coefficient of liquid crystal and the cell gap.

When the display state of an image is the black state, as shown in FIG. 6, the liquid crystal of the ECB liquid crystal layer 203 is deflected to a state in which the anisotropy coefficient $\Delta n$ equals to 0. The light from the backlight unit passes the lower polarizer 207 and then is changed to a linearly polarized light which is parallel with the polarization direction of the lower polarizer 207, i.e., the linearly polarized light has a polarization direction of 0 degree. The linearly polarized light passes the first half wave plate 2062, is deflected by 2 times the intersection angle, and is changed into a linearly polarized light with a polarization direction of 90 degrees. After passing the first quarter wave plate 2061, the linearly polarized light is changed to a left-handed polarized light. Then, the linearly polarized light passes the ECB liquid crystal layer 203 with Δn=0 and remains a left-handed polarized light. The left-handed polarized light passes the second quarter wave plate 2091 on an outer side of the assembly substrate 202, and is changed to a linearly polarized light with a polarization direction of 0 degree. Since the upper polarizer 210 has a polarization angle of 90 degrees, the linearly polarized light at this time is perpendicular to the polarization direction of the upper polarizer 210, the upper polarizer 210 does not transmit light, and the display state of an image is a black display state.

Figure 7:
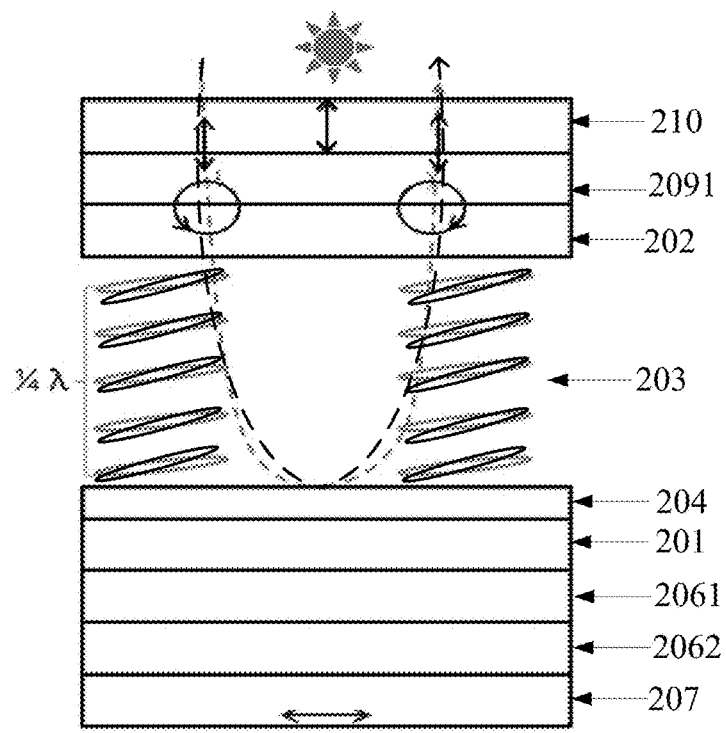
FIG. 7 is a view for the display panel shown in FIG. 4 operating in a totally reflective mode.
Figure 8:
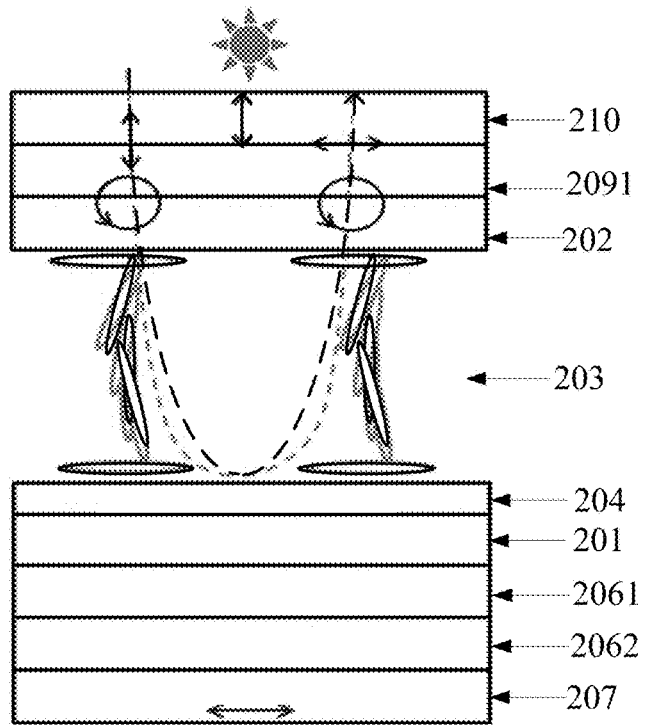
FIG. 8 is another view for the display panel shown in FIG. 4 operating in the totally reflective mode.

When the liquid crystal layer is an ECB liquid crystal layer, a display panel operating in the totally reflective mode in an embodiment of the present invention is shown by views in FIG. 7 and FIG. 8. At this time, the electrochromic reflective layer receives an electrical signal, the display panel exhibits a totally reflective mode, and the electrochromic reflective layer is configured to reflect external ambient light in the totally reflective mode. The electrochromic reflective layer 204 operates and is equivalent to a reflective layer, the backlight unit on the back side of the display panel is turned off, and the ambient light functions as a light source.

When the display state of an image is a white color state, as shown in FIG. 7, the ECB liquid crystal layer 203 can be controlled by an electric field, so that the liquid crystal is partially deflect and a phase delay of λ/4 which is equivalent to the quarter wave plate is realized. The ambient light passes the upper polarizer 210 and then is changed to a linearly polarized light which is parallel with the polarization direction of the upper polarizer 210, i.e., the linearly polarized light has a polarization direction of 90 degrees. After passing the second quarter wave plate 2091, the linearly polarized light is changed to a left-handed polarized light, which then passes the ECB liquid crystal layer 203 and is reflected by the electrochromic layer 204. Upon reaching the assembly substrate 202, the linearly polarized light is changed to a right-handed polarized light. The right-handed polarized light passes the second quarter wave plate 2091 on an outer side of the assembly substrate 202 and is changed to a linearly polarized light with a polarization direction of 90 degrees. Since the upper polarizer 210 has a polarization angle of 90 degrees, the linearly polarized light at this time is parallel with the polarization direction of the upper polarizer 210, the upper polarizer 210 transmits light, and the display state of an image is a white color display state.

When the display state of an image is a black state, as shown in FIG. 8, the liquid crystal of the ECB liquid crystal layer 203 is deflected to a state in which the anisotropy coefficient Δn equals to 0, the ambient light passes the upper polarizer 210 and then is changed to a linearly polarized light which is parallel with the polarization direction of the upper polarizer 210, i.e., the linearly polarized light has a polarization direction of 90 degrees. After passing the second quarter wave plate 2091, the linearly polarized light is changed to a left-handed polarized light. After passing the ECB liquid crystal layer 203 with Δn=0, the linearly polarized light remains a left-handed polarized light. The left-handed polarized light passes the second quarter wave plate 2091 on an outer side of the assembly substrate 202 and is changed to a linearly polarized light with a polarization direction of 0 degree. Since the upper polarizer 210 has a polarization angle of 90 degrees, the linearly polarized light at this time is perpendicular to the polarization direction of the upper polarizer 210, the upper polarizer 210 does not transmit light, and the display state of an image is a black display state.

As an additional remark, the first alignment film 205 and the second alignment film 208 in FIG. 4 are omitted in FIG. 5-FIG. 8.

Figure 9:
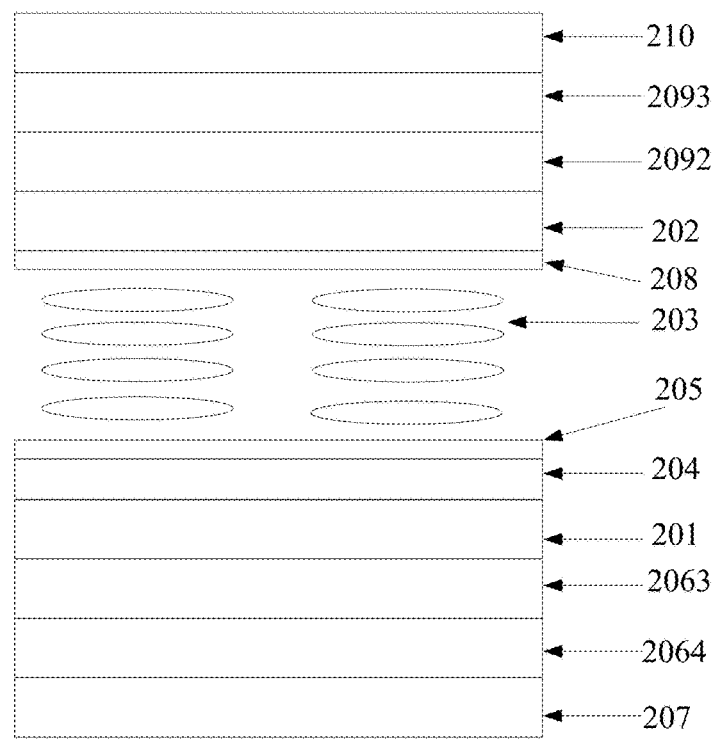
FIG. 9 is a structural view for another display panel in an embodiment of the present invention.

When the liquid crystal layer is a VA liquid crystal layer, a corresponding display panel can be shown in FIG. 9. The display panel comprises an array substrate 201, an assembly substrate 202, and a VA liquid crystal layer 203 which is formed between the array substrate 201 and the assembly substrate 202. The display panel has a totally transmissive mode and a totally reflective mode. The electrochromic reflective layer 204 is arranged on a side of the array substrate 201 close to the liquid crystal layer 203. The electrochromic reflective layer 204 is configured to reflect external ambient light in the totally reflective mode, and to exhibit a transparent state to completely transmit light in the totally transmissive mode. The display panel further comprises: a switch unit (not shown) which is electrically connected with the electrochromic reflective layer 204, is configured to control an electrical signal which is fed to the electrochromic reflective layer 204, and is a thin film transistor; a first alignment film 205 on the array substrate 201 on which the electrochromic reflective layer 204 is formed; a first quarter wave plate 2063, a first half wave plate 2064 and a lower polarizer 207 which are successively arranged on a side of the array substrate 201 away from the liquid crystal layer 203; a second alignment film 208 which is arranged on a side of the assembly substrate 202 close to the liquid crystal layer 203; a second quarter wave plate 2092, a second half wave plate 2093, and a upper polarizer 210 which are arranged on a side of the assembly substrate 202 away from the liquid crystal layer 203. Meanwhile, the lower polarizer 207 can have a polarization angle of 0 degree, the first quarter wave plate 2063 and the second quarter wave plate 2092 can have a polarization angle of 75 degree, the first half wave plate 2064 and the second half wave plate 2093 can have a polarization angle of 15 degree, and the upper polarizer 210 can have a polarization angle of 0 degree.

Figure 10:
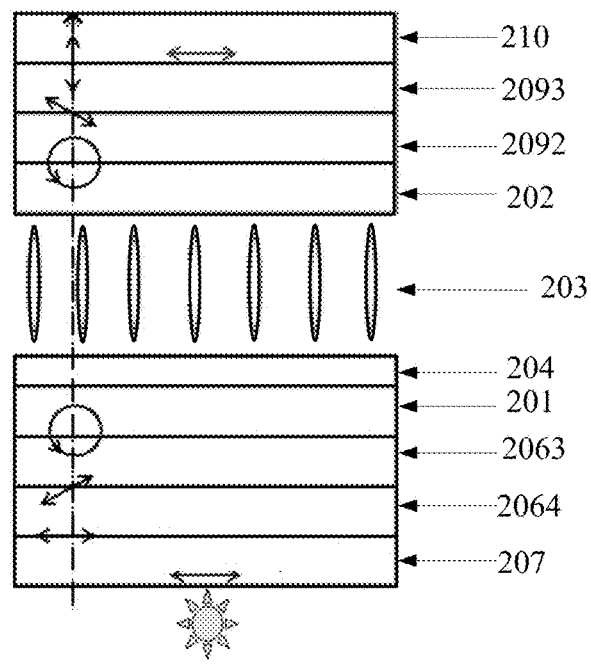
FIG. 10 is a view for the display panel shown in FIG. 9 operating in the totally transmissive mode.
Figure 11:
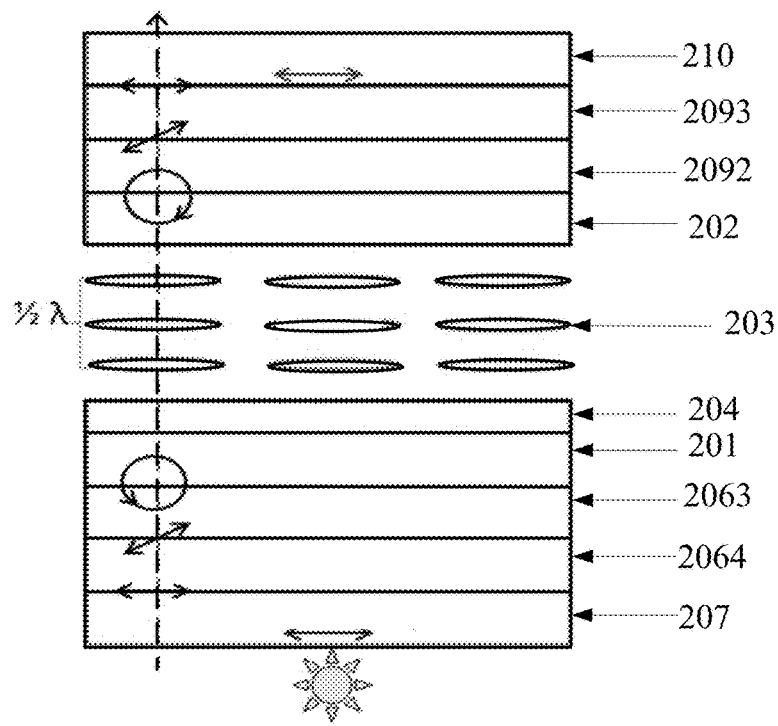
FIG. 11 is another view for the display panel shown in FIG. 9 operating in the totally transmissive mode.

When the liquid crystal layer is a VA liquid crystal layer, the display panel operating in the totally transmissive mode in an embodiment of the present invention provides is shown by views in FIG. 10 and FIG. 11. At this time, the electrochromic reflective layer does not receive an electrical signal, the display panel exhibits the totally transmissive mode, and the electrochromic reflective layer stays in a transparent state in the totally transmissive mode. The electrochromic reflective layer 204 is not in its operating state, and is equivalent to a transparent layer. The backlight unit on the back side of the display panel functions as a light source.

When the display state of an image is a black state, as shown in FIG. 10, the liquid crystal of the VA liquid crystal layer 203 is not in its operating state, light from the backlight unit passes the lower polarizer 207 and then is changed to a linearly polarized light which is parallel with the polarization direction of the lower polarizer 207, i.e., the linearly polarized light has a polarization direction of 0 degree. The linearly polarized light passes the first half wave plate 2064 and is deflected by 2 times the intersection angle, so that it is changed to a linearly polarized light with a polarization direction of 30 degrees. After passing the first quarter wave plate 2063, the linearly polarized light is changed to a left-handed polarized light. After passing the VA liquid crystal layer with Δn=0, the linearly polarized light remains a left-handed polarized light. The left-handed polarized light passes the second quarter wave plate 2092 on an outer side of the assembly substrate 202 and is changed to a linearly polarized light with a polarization direction of −60 degrees. After passing the second half wave plate 2093, the linearly polarized light is deflected by 2 times the intersection angle, and changed to a linearly polarized light with a polarization direction of 90 degrees. Since the upper polarizer 210 has a polarization angle of 0 degree, the linearly polarized light at this time is perpendicular to the polarization direction of the upper polarizer 210, and the display state of an image is a black display state.

When the display state of an image is a white color state, as shown in FIG. 11, the VA liquid crystal layer 203 is deflected to a maximum angle, which is equivalent to a λ/2 phase delay realized by a half wave plate. The light from the backlight unit passes the lower polarizer 207 and is changed to a linearly polarized light which is parallel with the polarization direction of the lower polarizer 207, i.e., the linearly polarized light has a polarization direction of 0 degree. After passing the first half wave plate 2064, the linearly polarized light is deflected by 2 times the intersection angle, and is changed to a linearly polarized light with a polarization direction of 30 degrees. After passing the first quarter wave plate 2063, the linearly polarized light is changed to a left-handed polarized light. Then, after passing the VA liquid crystal layer, the linearly polarized light is changed to a right-handed polarized light. After passing the second quarter wave plate 2092 on an outer side of the assembly substrate 202, the linearly polarized light is changed to a linearly polarized light with a polarization direction of 30 degrees. After passing the second half wave plate 2093, the linearly polarized light is deflected by 2 times the intersection angle and is changed to a linearly polarized light with a polarization direction of 0 degree. Since the upper polarizer 210 has a polarization angle of 0 degree, the linearly polarized light at this time is parallel with the polarization direction of the upper polarizer 210, and the display state of an image is a white color display state.

Figure 12:
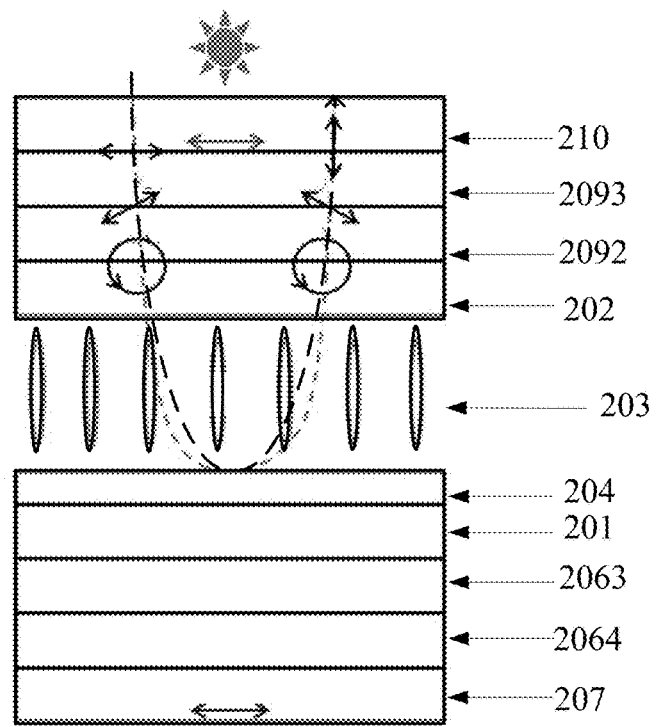
FIG. 12 is a view for the display panel shown in FIG. 9 operating in the totally reflective mode.
Figure 13:
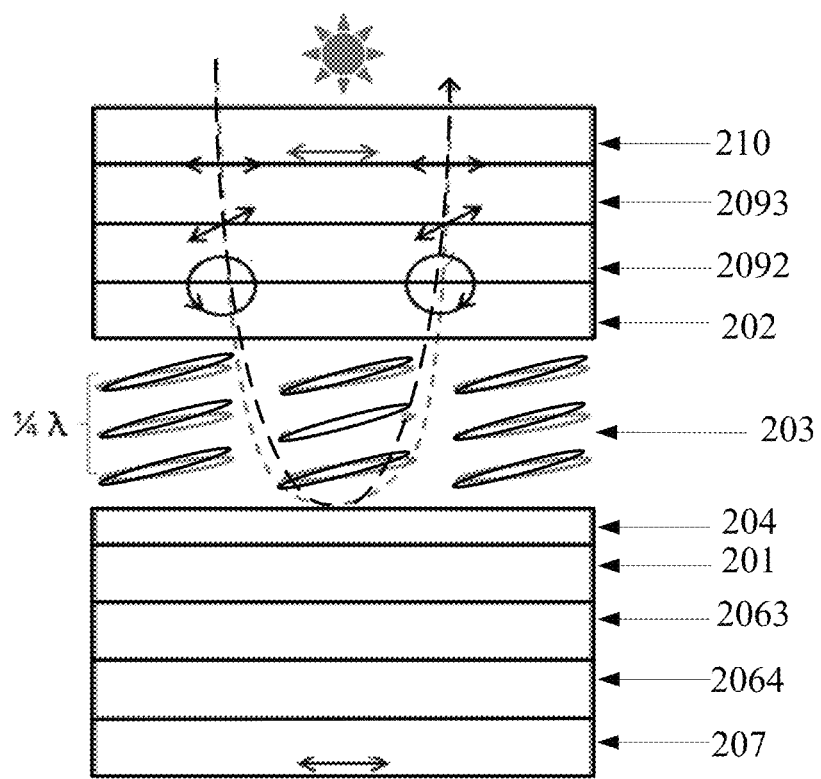
FIG. 13 is another view for the display panel shown in FIG. 9 operating in the totally reflective mode.

When the liquid crystal layer is a VA liquid crystal layer, the display panel operating in the totally reflective mode in an embodiment of the present invention is shown by views in FIG. 12 and FIG. 13. At this time, the electrochromic reflective layer receives an electrical signal, the display panel exhibits a totally reflective mode, and the electrochromic reflective layer is configured to reflect external ambient light in the totally reflective mode. The electrochromic reflective layer 204 operates and is equivalent to a reflective layer, the backlight unit on the back side of the display panel is turned off, and the ambient light functions as a light source.

When the display state of an image is a black state, as shown in FIG. 12, the liquid crystal of the VA liquid crystal layer 203 is not in its operating state, the ambient light passes the upper polarizer 210 and then is changed to a linearly polarized light which is parallel with the polarization direction of the upper polarizer 210, i.e., the linearly polarized light has a polarization direction of 0 degree. The linearly polarized light passes the second half wave plate 2093, is deflected by 2 times the intersection angle, and is changed to a linearly polarized light with a polarization direction of 30 degrees. After passing the second quarter wave plate 2092, the linearly polarized light is changed to a left-handed polarized light. Since the liquid crystal is not in its operating state, i.e., n=0, the light which is reflected by the electrochromic reflective layer 204 and reaches the assembly substrate 202 is still a left-handed polarized light. After passing the second quarter wave plate 2092, the light is changed to a linearly polarized light with a polarization direction of −60 degrees. After passing the second half wave plate 2093, the linearly polarized light is deflected by 2 times the intersection angle, and is changed to a linearly polarized light with a polarization direction of 90 degrees. Since the upper polarizer 210 has a polarization angle of 0 degree, the linearly polarized light at this time is perpendicular to the polarization direction of the upper polarizer 210, and the display state of an image is a black display state.

When the display state of an image is a white color state, as shown in FIG. 13, the VA liquid crystal layer 203 can be controlled by an electric field, so that the liquid crystal is partially deflected and a phase delay of λ/4 which is equivalent to the quarter wave plate is realized. The ambient light passes the upper polarizer 210 and then is changed to a linearly polarized light which is parallel with the polarization direction of the upper polarizer 210, i.e., the linearly polarized light has a polarization direction of 0 degree. After passing the second half wave plate 2093, the linearly polarized light is deflected by 2 times the intersection angle, and is changed to a linearly polarized light with a polarization direction of 30 degrees. After passing the second quarter wave plate 2092, the linearly polarized light is changed to a left-handed polarized light. The linearly polarized light which is reflected by the electrochromic reflective layer 204 and reaches the assembly substrate 202 is changed to a right-handed polarized light. After passing the second quarter wave plate 2092, the linearly polarized light is changed to a linearly polarized light with a polarization direction of 30 degrees. After passing the second half wave plate 2093, the linearly polarized light is deflected by 2 times the intersection angle, and is changed to a linearly polarized light with a polarization direction of 0 degree. Since the upper polarizer 210 has a polarization angle of 0 degree, the linearly polarized light at this time is parallel with the polarization direction of the upper polarizer 210, and the display state of an image is a white color display state.

As an additional remark, the first alignment film 205 and the second alignment film 208 in FIG. 9 are omitted in FIG. 10-FIG. 13. Besides, both the first quarter wave plate 2061 in FIG. 4 and the first quarter wave plate 2063 in FIG. 9 are made from a quarter wave plate, although they have different polarization angles, due to the different intersection angles between the polarization axis of the wave plate and an edge of the wave plate in a trimming process. Both the first half wave plate 2062 in FIG. 4 and the first half wave plate 2064 in FIG. 9 are made from a half wave plate, but have different polarization angles, due to the different intersection angles between the polarization axis of the wave plate and an edge of the wave plate in the trimming process. Both the second quarter wave plate 2091 in FIG. 4 and the second quarter wave plate 2092 in FIG. 9 are made from a quarter wave plate, although they have different polarization angles, due to the different intersection angles between the polarization axis of the wave plate and an edge of the wave plate in a trimming process.

In the display panel of embodiments of the present invention, an electrochromic reflective layer is formed between an array substrate and a first alignment film, a partial deflection effect is used to control phase delay of the liquid crystal, and a phase retardation film i.e., a wave plate, is combined to realize switching between a totally transmissive display and a totally reflect display.

To sum up, in the display panel of embodiments of the present invention, since an electrochromic reflective layer is arranged between an array substrate and a first alignment film, the electrochromic reflective layer is equivalent to a transparent layer in a totally transmissive mode and a reflective layer in a totally reflective mode, a transmission region and a reflection region are located at a same region, and the electrochromic reflective layer is combined with a liquid crystal layer to realize switching between the totally transmissive display and the totally reflect display. As compared with the related art, the transmission region and the reflection region are increased in area, which increases the aperture ratio, transmittance, and thus quality of the displayed image.

Embodiments of the present invention provide a method for fabricating a display panel, which is used for fabricating the display panel shown in FIG. 2, FIG. 3, FIG. 4, or FIG. 9. The method comprises:

forming the electrochromic reflective layer on the side of the array substrate close to the liquid crystal layer, when the electrochromic reflective layer receives an electrical signal, the display panel exhibits the totally reflective mode, and the electrochromic reflective layer is configured to reflect external ambient light in the totally reflective mode; and when the electrochromic reflective layer does not receive an electrical signal, the display panel exhibits a totally transmissive mode, and the electrochromic reflective layer stays in a transparent state in the totally transmissive mode.

In a method for fabricating a display panel in an embodiment of the present invention, since an electrochromic reflective layer is arranged between an array substrate and a first alignment film, the electrochromic reflective layer is equivalent to a transparent layer in a totally transmissive mode and a reflective layer in a totally reflective mode, a transmission region and a reflection region are located at a same region, and the electrochromic reflective layer is combined with a liquid crystal layer to realize switching between the totally transmissive display and the totally reflect display. As compared with the related art, the transmission region and the reflection region are increased in area, which increases the aperture ratio, transmittance, and thus quality of the displayed image.

Figure 14:
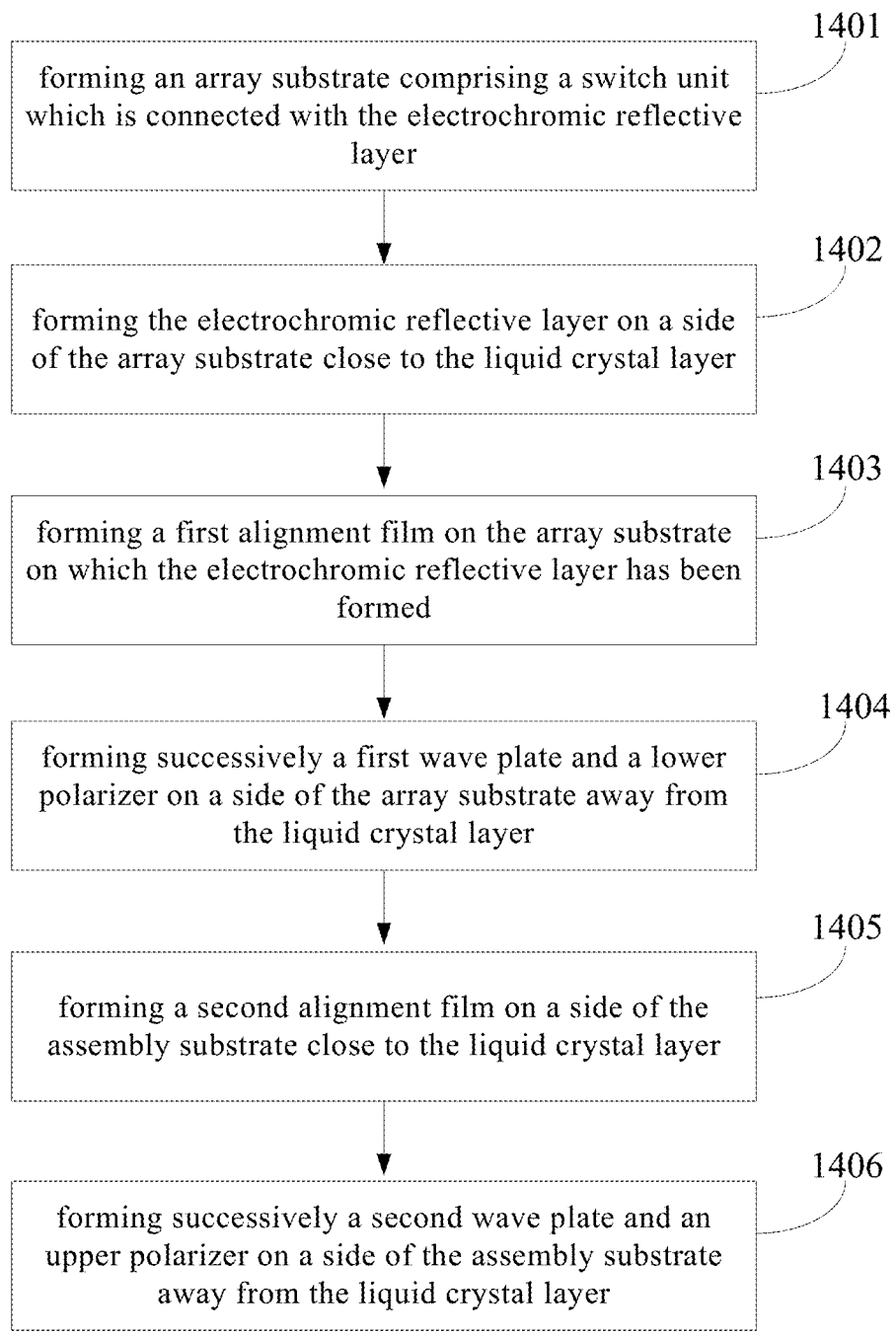
FIG. 14 is a flow chart for a method for fabricating a display panel in an embodiment of the present invention.

An embodiment of the present invention provides another method for fabricating a display panel, which is used for fabricating the display panel shown in FIG. 2, FIG. 3, FIG. 4, or FIG. 9. As shown in FIG. 14, the method comprises the following steps.

Step 1401, forming an array substrate comprising a switch unit which is connected with the electrochromic reflective layer.

The switch unit is configured to control an electrical signal which is fed to the electrochromic reflective layer. The switch unit is a thin film transistor.

Step 1402, forming the electrochromic reflective layer on a side of the array substrate close to the liquid crystal layer.

As shown in FIG. 2, the display panel comprises the array substrate 201, the assembly substrate 202, and the liquid crystal layer 203 which is arranged between the array substrate 201 and the assembly substrate 202. The display panel has a totally transmissive mode and a totally reflective mode. The electrochromic reflective layer 204 is arranged on a side of the array substrate 201 close to the liquid crystal layer 203. When the electrochromic reflective layer receives an electrical signal, the display panel exhibits the totally reflective mode, and the electrochromic reflective layer is configured to reflect external ambient light in the totally reflective mode; and when the electrochromic reflective layer does not receive an electrical signal, the display panel exhibits the totally transmissive mode, and the electrochromic reflective layer stays in a transparent state in the totally transmissive mode. The electrochromic reflective layer can realize switching between the totally transmissive display and the totally reflect display.

Step 1403, forming a first alignment film on the array substrate on which the electrochromic reflective layer has been formed.

Figure 15:
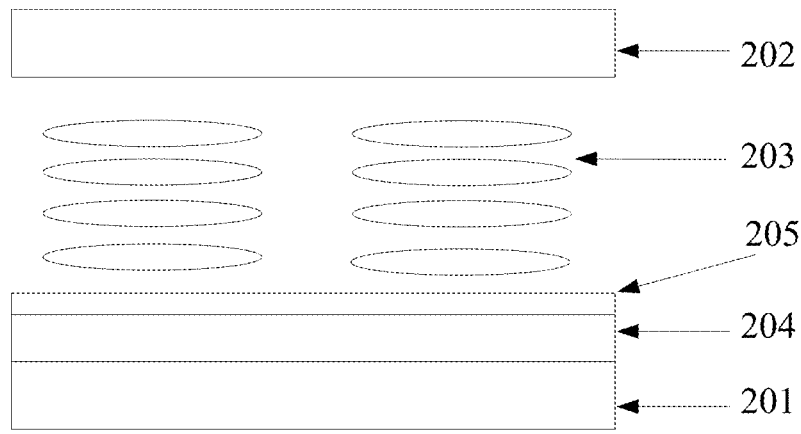
FIG. 15 is a structural view for a first alignment film in an embodiment of the present invention.

On basis of step 1402, as shown in FIG. 15, the first alignment film 205 is formed on the array substrate 201 on which the electrochromic reflective layer 204 has been formed.

Step 1404, forming successively a first wave plate and a lower polarizer on a side of the array substrate away from the liquid crystal layer.

Figure 16:
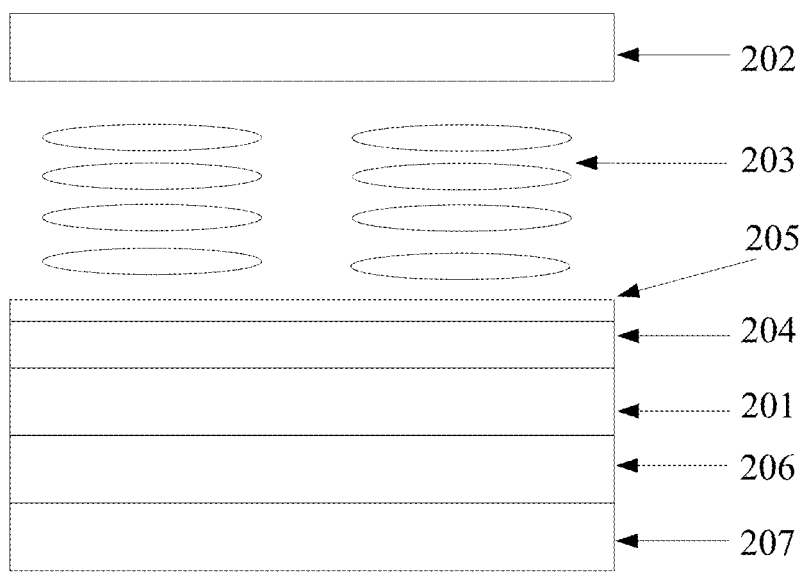
FIG. 16 is a structural view for a first wave plate and a lower polarizer in an embodiment of the present invention.

On basis of step 1403, as shown in FIG. 16, the first wave plate 206 and the lower polarizer 207 are successively arranged on the side of the array substrate 201 away from the liquid crystal layer 203.

Step 1405, forming a second alignment film on a side of the assembly substrate close to the liquid crystal layer.

On basis of step 1404, as shown in FIG. 17, the second alignment film 208 is arranged on the side of the assembly substrate 202 close to the liquid crystal layer 203.

Step 1406, forming successively a second wave plate and an upper polarizer on a side of the assembly substrate away from the liquid crystal layer.

On basis of step 1405, as shown in FIG. 3, the second wave plate 209 and the upper polarizer 210 are successively arranged on the side of the assembly substrate 202 away from the liquid crystal layer 203.

For example, the first wave plate comprises a first quarter wave plate and a first half wave plate.

Accordingly, step 1404 can comprise:

forming successively a first quarter wave plate, a first half wave plate, and a lower polarizer on a side of the array substrate away from the liquid crystal layer. The resulting structure formed by this step can be illustrated by the view shown in FIG. 4.

For example, the second wave plate comprises a second quarter wave plate.

Accordingly, step 1406 can comprise:

forming successively a second quarter wave plate and an upper polarizer on a side of the assembly substrate away from the liquid crystal layer. The resulting structure formed by this step can be illustrated by the view shown in FIG. 4.

For example, when the liquid crystal layer is an electrically controlled birefringence liquid crystal layer, the lower polarizer has a polarization angle of 0 degree, the first quarter wave plate and the second quarter wave plate have a polarization angle of 135 degree, the first half wave plate has a polarization angle of 45 degree, the upper polarizer has a polarization angle of 90 degrees, the first alignment film has a rubbing orientation of 135 degree, and the second alignment film has a rubbing orientation of −135 degree.

Furthermore, the second wave plate further comprises a second half wave plate.

Accordingly, step 1406 can comprise:

forming successively a second quarter wave plate, a second half wave plate, and an upper polarizer on a side of the assembly substrate away from the liquid crystal layer. The resulting structure formed by this step can be illustrated by the view shown in FIG. 9.

For example, when the liquid crystal layer is a vertical alignment liquid crystal layer, the lower polarizer has a polarization angle of 0 degree; the first quarter wave plate and the second quarter wave plate have a polarization angle of 75 degree; the first half wave plate and the second half wave plate have a polarization angle of 15 degree; the upper polarizer has a polarization angle of 0 degree.

To sum up, in the method for fabricating a display panel of embodiments of the present invention, since an electrochromic reflective layer is arranged between an array substrate and a first alignment film, the electrochromic reflective layer is equivalent to a transparent layer in a totally transmissive mode and a reflective layer in a totally reflective mode, a transmission region and a reflection region are located at a same region, and the electrochromic reflective layer is combined with a liquid crystal layer to realize switching between the totally transmissive display and the totally reflect display. As compared with the related art, the transmission region and the reflection region are increased in area, which increases the aperture ratio, transmittance, and thus quality of the displayed image.

Embodiments of the present invention provide a method for driving a display panel, which is used for driving the above mentioned display panel. As shown in FIG. 18, the method comprises:

Step 1801, sending an electrical signal to the electrochromic reflective layer, so that the display panel exhibits the totally reflective mode, and the electrochromic reflective layer is configured to reflect external ambient light in the totally reflective mode.

Step 1802, stopping sending the electrical signal to the electrochromic reflective layer, so that the display panel exhibits the totally transmissive mode, the electrochromic reflective layer stays in a transparent state in the totally transmissive mode.

To sum up, in the method for driving a display panel of embodiments of the present invention, by sending an electrical signal to the electrochromic reflective layer, so that the display panel exhibits the totally reflective mode, and stopping sending the electrical signal to the electrochromic reflective layer, so that the display panel exhibits the totally transmissive mode, the electrochromic reflective layer is equivalent to a transparent layer in the totally transmissive mode and a reflective layer in the totally reflective mode. A transmission region and a reflection region are located at a same region, and the electrochromic reflective layer is combined with a liquid crystal layer to realize switching between the totally transmissive display and the totally reflect display. As compared with the related art, the transmission region and the reflection region are increased in area, which increases the aperture ratio, transmittance, and thus quality of the displayed image.

Embodiments of the present invention provide a display device. The display device can comprise the display panel shown in FIG. 2, FIG. 3, FIG. 4, or FIG. 9, and a backlight unit. The display device comprises a liquid crystal panel, a liquid crystal TV, mobile phone, tablet computer, navigator, or the like. In the display panel of embodiments of the present invention, since an electrochromic reflective layer is arranged between an array substrate of the display panel and a first alignment film, the electrochromic reflective layer is equivalent to a transparent layer in a totally transmissive mode and a reflective layer in a totally reflective mode, a transmission region and a reflection region are located at a same region, and the electrochromic reflective layer is combined with a liquid crystal layer to realize switching between the totally transmissive display and the totally reflect display. As compared with the related art, the transmission region and the reflection region are increased in area, which increases the aperture ratio, transmittance, and thus quality of the displayed image.

Although the present invention has been described above with reference to exemplary embodiments, it should be understood that the described embodiments are merely for illustrative purpose and by no means limiting. All variations, equivalents, modifications that fall within the spirit and principle of the present invention are intended to be embraced in the protection scope of the present invention.

The invention claimed is:

1. A display panel, comprising an array substrate, an assembly substrate, and a liquid crystal layer arranged between the array substrate and the assembly substrate, wherein the display panel has a totally transmissive mode and a totally reflective mode, the display panel comprises:
   an electrochromic reflective layer which is arranged on a side of the array substrate close to the liquid crystal layer,
   the electrochromic reflective layer is configured to reflect external ambient light in the totally reflective mode, and to exhibit a transparent state to completely transmit light in the totally transmissive mode,
   wherein the display panel further comprises: a first alignment film which is arranged on the array substrate with the electrochromic reflective layer; a first wave plate and a lower polarizer which are arranged successively on a side of the array substrate away from the liquid crystal layer; a second alignment film which is arranged on a side of the assembly substrate close to the liquid crystal layer; and a second wave plate and an upper polarizer which are arranged successively on a side of the assembly substrate away from the liquid crystal layer,
   wherein the first wave plate comprises a first quarter wave plate and a first half wave plate, and the first quarter wave plate, the first half wave plate and the lower polarizer are successively arranged on the side of the array substrate away from the liquid crystal layer,
   wherein the second wave plate comprises a second quarter wave plate, the second quarter wave plate and the upper polarizer are arranged on the side of the assembly substrate away from the liquid crystal layer, the liquid crystal layer is an electrically controlled birefringence liquid crystal layer, the lower polarizer has a polarization angle of 0 degree, the first quarter wave plate and the second quarter wave plate have a polarization angle of 135 degrees, the first half wave plate has a polarization angle of 45 degrees, the upper polarizer has a polarization angle of 90 degrees, the first alignment film has a rubbing orientation of 135 degrees, and the second alignment film has a rubbing orientation of −135 degrees, or
   wherein the second wave plate comprises a second quarter wave plate and a second half wave plate, the second quarter wave plate, the second half wave plate and the upper polarizer are arranged on the side of the assembly substrate away from the liquid crystal layer, the liquid crystal layer is a vertical alignment liquid crystal layer, the lower polarizer has a polarization angle of 0 degree, the first quarter wave plate and the second quarter wave plate have a polarization angle of 75 degrees, the first half wave plate and the second half wave plate have a polarization angle of 15 degrees, and the upper polarizer has a polarization angle of 0 degree.

2. The display panel of claim 1, wherein the display panel further comprises a switch unit which is electrically connected with the electrochromic reflective layer, and configured to control an electrical signal fed to the electrochromic reflective layer.

3. The display panel of claim 2, wherein the switch unit is a thin film transistor.

4. A method for fabricating the display panel of claim 1, wherein the method comprises:
   forming the electrochromic reflective layer on the side of the array substrate close to the liquid crystal layer,
   when the electrochromic reflective layer receives an electrical signal, the display panel exhibits the totally reflective mode, and the electrochromic reflective layer is configured to reflect external ambient light in the totally reflective mode; and
   when the electrochromic reflective layer does not receive the electrical signal, the display panel exhibits the totally transmissive mode, and the electrochromic reflective layer stays in a transparent state in the totally transmissive mode,
   wherein the method further comprises forming a first alignment film on the array substrate on which the electrochromic reflective layer has been formed, forming successively a first wave plate and a lower polarizer on a side of the array substrate away from the liquid crystal layer, forming a second alignment film on a side of the assembly substrate close to the liquid crystal layer, and forming successively a second wave plate and an upper polarizer on a side of the assembly substrate away from the liquid crystal layer,
   wherein the first wave plate comprises a first quarter wave plate and a first half wave plate, and said forming successively the first wave plate and the lower polarizer on the side of the array substrate away from the liquid crystal layer comprises forming successively the first quarter wave plate, the first half wave plate and the lower polarizer on the side of the array substrate away from the liquid crystal layer,
   wherein the second wave plate comprises a second quarter wave plate, said forming successively the second wave plate and the upper polarizer on the side of the assembly substrate away from the liquid crystal layer comprises forming successively the second quarter wave plate and the upper polarizer on the side of the assembly substrate away from the liquid crystal layer, the liquid crystal layer is an electrically controlled birefringence liquid crystal layer, the lower polarizer has a polarization angle of 0 degree, the first quarter wave plate and the second quarter wave plate have a polarization angle of 135 degrees, the first half wave plate has a polarization angle of 45 degrees, the upper polarizer has a polarization angle of 90 degrees, the first alignment film has a rubbing orientation of 135 degrees, and the second alignment film has a rubbing orientation of −135 degrees, or
   wherein the second wave plate further comprises a second half wave plate, said forming successively the second wave plate and the upper polarizer on the side of the assembly substrate away from the liquid crystal layer comprises forming successively the second quarter wave plate, the second half wave plate and the upper polarizer on the side of the assembly substrate away from the liquid crystal layer, the liquid crystal layer is a vertical alignment liquid crystal layer, the lower polarizer has a polarization angle of 0 degree, the first quarter wave plate and the second quarter wave plate have a polarization angle of 75 degrees, the first half wave plate and the second half wave plate have a polarization angle of 15 degrees, and the upper polarizer has a polarization angle of 0 degree.

5. The method of claim 4, wherein, before forming the electrochromic reflective layer on the side of the array substrate close to the liquid crystal layer, the method further comprises:
   forming the array substrate comprising a switch unit which is connected with the electrochromic reflective layer and configured to control the electrical signal fed to the electrochromic reflective layer.

6. The method of claim 5, wherein the switch unit is a thin film transistor.

7. A method for driving a display panel, comprising an array substrate, an assembly substrate, and a liquid crystal layer arranged between the array substrate and the assembly substrate, wherein the display panel has a totally transmissive mode and a totally reflective mode, the display panel comprises:
   an electrochromic reflective layer which is arranged on a side of the array substrate close to the liquid crystal layer,
   the electrochromic reflective layer is configured to reflect external ambient light in the totally reflective mode, and to exhibit a transparent state to completely transmit light in the totally transmissive mode,
   wherein the display panel further comprises: a first alignment film which is arranged on the array substrate with the electrochromic reflective layer; a first wave plate and a lower polarizer which are arranged successively on a side of the array substrate away from the liquid crystal layer; a second alignment film which is arranged on a side of the assembly substrate close to the liquid crystal layer; and a second wave plate and an upper polarizer which are arranged successively on a side of the assembly substrate away from the liquid crystal layer,
   wherein the first wave plate comprises a first quarter wave plate and a first half wave plate, and the first quarter wave plate, the first half wave plate and the lower polarizer are successively arranged on the side of the array substrate away from the liquid crystal layer,
   wherein the second wave plate comprises a second quarter wave plate, the second quarter wave plate and the upper polarizer are arranged on the side of the assembly substrate away from the liquid crystal layer, the liquid crystal layer is an electrically controlled birefringence liquid crystal layer, the lower polarizer has a polarization angle of 0 degree, the first quarter wave plate and the second quarter wave plate have a polarization angle of 135 degrees, the first half wave plate has a polarization angle of 45 degrees, the upper polarizer has a polarization angle of 90 degrees, the first alignment film has a rubbing orientation of 135 degrees, and the second alignment film has a rubbing orientation of −135 degrees, or
   wherein the second wave plate comprises a second quarter wave plate and a second half wave plate, the second quarter wave plate, the second half wave plate and the upper polarizer are arranged on the side of the assembly substrate away from the liquid crystal layer, the liquid crystal layer is a vertical alignment liquid crystal layer, the lower polarizer has a polarization angle of 0 degree, the first quarter wave plate and the second quarter wave plate have a polarization angle of 75 degrees, the first half wave plate and the second half wave plate have a polarization angle of 15 degrees, and the upper polarizer has a polarization angle of 0 degree, wherein the method comprises:

sending an electrical signal to the electrochromic reflective layer, so that the display panel exhibits the totally reflective mode, and the electrochromic reflective layer is configured to reflect external ambient light in the totally reflective mode; and stopping sending the electrical signal to the electrochromic reflective layer, so that the display panel exhibits the totally transmissive mode, and the electrochromic reflective layer stays in a transparent state in the totally transmissive mode.

8. A display device, comprising the display panel of claim 1 and a backlight unit.

* * * * *